(12) United States Patent
Tanahashi et al.

(10) Patent No.: US 6,185,091 B1
(45) Date of Patent: Feb. 6, 2001

(54) FOUR-TERMINAL CAPACITOR

(75) Inventors: Masakazu Tanahashi, Osaka; Mikinari Shimada; Emiko Igaki, both of Kyoto, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/246,374

(22) Filed: Feb. 8, 1999

(30) Foreign Application Priority Data

Feb. 9, 1998 (JP) .................................................. 10-044439

(51) Int. Cl.⁷ .......................... H01G 9/042; H01G 9/045; H01G 9/00
(52) U.S. Cl. ......................... 361/529; 361/524; 361/540
(58) Field of Search .................................. 361/523, 524, 361/525, 526, 528, 529, 530, 531, 532, 533, 534, 502, 503, 508, 509, 510, 511, 512, 515, 517, 518, 519, 520, 522, 540

(56) References Cited

U.S. PATENT DOCUMENTS

| | | | |
|---|---|---|---|
| 3,988,650 | * 10/1976 | Fritze ................................... | 361/511 |
| 4,422,126 | 12/1983 | James . | |
| 4,510,554 | * 4/1985 | Irkura ................................... | 361/540 |
| 4,539,623 | * 9/1985 | Irkura ................................... | 361/540 |
| 4,780,796 | * 10/1988 | Fukuda et al. ....................... | 361/525 |
| 4,916,576 | 4/1990 | Herbert et al. . | |
| 5,019,949 | * 5/1991 | Ikeda et al. ......................... | 361/525 |
| 5,815,367 | 9/1998 | Asakura et al. . | |
| 5,914,852 | * 6/1999 | Hatanaka et al. .................... | 361/523 |

FOREIGN PATENT DOCUMENTS

| | | |
|---|---|---|
| 0 283 239 | 9/1988 | (EP) . |
| 2 010 582 | 6/1979 | (GB) . |
| 51-51749 | 5/1976 | (JP) . |
| 52-56352 | 5/1977 | (JP) . |
| 53-86457 | 7/1978 | (JP) . |
| 53-111461 | 9/1978 | (JP) . |
| 63-148610 | 6/1988 | (JP) . |
| 4-32214 | 2/1992 | (JP) . |
| 4-38810 | 2/1992 | (JP) . |
| 6-120088 | 4/1994 | (JP) . |
| 6-267801 | 9/1994 | (JP) . |
| 6-267802 | 9/1994 | (JP) . |
| 7-78730 | 3/1995 | (JP) . |
| 7-226206 | 10/1995 | (JP) . |
| 7-320987 | 12/1995 | (JP) . |

OTHER PUBLICATIONS

1992, Yoichi Aoshima "Chip Type Speciality Polymer Aluminum Electrolytic Capacitor SP Cap CA Series" *Proceeding of '92 Symposium on Switching Power Supply System*, pp. S6–2–1 thru S6–2–10.
European Search Report.

* cited by examiner

*Primary Examiner*—Kristine Kincaid
*Assistant Examiner*—Eric Thomas
(74) *Attorney, Agent, or Firm*—Merchant & Gould P.C.

(57) ABSTRACT

Anodic valve metal foils, roughened and provided with dielectric layers, and collector metal foils (metal foils for collector) are laminated alternately to cross with cathodic electroconductive polymer layers therebetween. Anodic terminals and cathodic terminals are connected with the respective ends of the metal foils. For the anodic valve metal foils, an aluminum foil whose internal is an unroughened bulk metal layer is used. The collector metal foil is selected from the group consisting of an Al foil similar to the anodic valve metal foil, an Ni foil, a Cu foil, and an aluminum foil including carbon. As a result, a four-terminal capacitor to provide high capacitance, low impedance, high current-carrying capacity and less heat generation, as well as low ESR and low ESL, is obtained.

6 Claims, 14 Drawing Sheets

US 6,185,091 B1

FOUR-TERMINAL CAPACITOR

FIELD OF THE INVENTION

The present invention relates to electrolytic capacitors for electric circuits of power supplies or the like.

BACKGROUND OF THE INVENTION

Conventionally, electrolytic capacitors and multilayer ceramic capacitors have been well known. Electrolytic capacitors comprise valve metals such as Al and Ta, while multilayer ceramic capacitors comprise electrodes of, for example, Pd or Ni and dielectrics of $BaTiO_3$ or the like. Most of these capacitors, which are used for most electric circuits such as supplies, have two electrode terminals. According to the recent trend for requirement for smaller electric circuits that can be operated at high frequencies operating circuits, capacitors are also required to have high capacitance and low impedance. Regarding power supply circuits for driving CPU of computers or switching power supply circuits, particularly, higher noise rejecting property and ripple current absorbing property are required to design circuits that will be operated at high frequencies. As a result, low impedance capacitors with low equivalent series resistance (ESR), low equivalent series inductance (ESL), against high ripple current absorbing property and high capacitance are demanded highly. To meet the requirements, especially for obtaining low ESR, electroconductive polymers with high electric conductivity have been studied and developed to be used for solid electrolytes for cathode (hereinafter, cathodic solid electrolytes) of electrolytic capacitors.

The structure of a conventional aluminum electrolytic capacitor is explained below with a reference to FIG. 10. A capacitor element is manufactured by the steps of:
- preparing an anodic foil 81 by roughening and forming a dielectric layer on the surface and also preparing a surface-roughened current-collecting cathodic foil 82;
- arranging separators 83 between the anodic foil 81 and the current-collecting cathodic foil 82; and
- winding the anodic foil 81, the current-collecting cathodic foil 82 and the separators 83. This element is sealed in a case with an electrolytic solution. Leads 84 as electrode terminals are connected respectively with the anodic foil 81 and the current-collecting cathodic foil 82.

The structure of a conventional multilayer ceramic chip capacitor is explained below with a reference to FIG. 11. Electrode layers 91 comprising sintered bodies of Pd, Ni or the like and dielectric layers 92 are laminated alternately. The electrode layers 91 are connected alternately with electrode terminals 93.

The structure of a conventional tantalum electrolytic capacitor with electroconductive polymer is explained below with a reference to FIGS. 12(a) and 12(b). FIG. 12(a) is a cross-sectional view showing the structure of a conventional tantalum electrolytic capacitor with electroconductive polymer, and FIG. 12(b) is an expanded cross-sectional view partially showing the configuration of a capacitor element. A capacitor element 101 is prepared by forming a dielectric layer 101b on the surface of a tantalum powder sintered body 101c, and subsequently forming on the dielectric layer 101b an electroconductive polymer layer 101a. The electroconductive polymer layer 101a acts as the true cathode, and it is connected to a cathodic terminal 102 via an electroconductive adhesive layer 103. The anodic terminal 104 is connected to a lead 105 from the sintered body 101c. The element including these members is encased with a mold resin layer 106.

In addition to that, decreasing inductance value is further required to lower the impedance at high frequencies of about 100 kHz or more. Regarding this requirement, four-terminal capacitors (capacitors with four electrode terminals) are disclosed, for example, in Japanese Laid-Open Patent Publication (Tokkai-Hei) No. 6-267802, Tokkai-Hei No. 6-267801, and "SP-cap" (a trademark of Matsushita Electric Industrial Co., Ltd. see Proceeding of '92 Symposium on Switching Power Supply System (S6(1994)-1-1)). On the other hand, there is a need for development of capacitors to allow relatively high current to the primary or secondary side of a power supply, while meeting the requirement for operation at high frequencies. An invention of a capacitor to decrease the entire impedance and raise the current-carrying capacity is also disclosed by Tokkai-Hei No. 4-32214.

The above-mentioned aluminum electrolytic capacitor, however, has some disadvantages, including its high impedance due to the use of an electrolytic solution comprising ethylene glycol or the like as the main solvent, and its high inductance components due to the wound electrode foil. Although a conventional tantalum electrolytic capacitor lowers ESR by using electroconductive polymers for the electrolyte, high capacitance cannot be obtained sufficiently. A conventional multilayer ceramic chip capacitor cannot obtain high capacitance in comparison with a conventional aluminum electrolytic capacitor. In conventional techniques where a four-terminal structure is adapted to lower ESL flowering the inductance value), sufficient capacitance has not been obtained. In addition, the capacitor itself will generate heat and fail at the primary or secondary side of a power supply where relatively high current from about several A to several dozens of a flows. Considering these disadvantages, such a conventional capacitor cannot be used to pass a high current while meeting the requirement for circuits to be operated at high frequencies.

The reasons are as follows. In a conventional aluminum electrolytic capacitor prepared by winding a slender electrode foil, the resistance of the foil becomes high and the capacitor element will generate heat easily even if a four-terminal structure is used. A conventional tantalum electrolytic capacitor also can lower the ESR to some degree by using functional polymers. It is not easy, however, to raise capacitance per volume to provide high capacitance because a sintered body is used, and a four-terminal structure is difficult to obtain. A multilayer ceramic capacitor disclosed in Tokkai-Hei No. 4-32214 adapts a four-terminal structure to lower ESL, and increases current-carrying capacity by providing double electrode layers. For the manufacturing process, the material for the electrode layers should be a sintered metal with a thickness of several μm. Therefore, the available current value is limited to several amperes, so the lamination number should be increased to be used for the primary or secondary side of the power supply or the like where relatively high current will flow. Increasing the lamination is not easy in the manufacturing steps, or the volume per capacitance will be increased if many electrode layers are laminated. The electrode layer cannot be made thicker than 3 μm substantially, since delamination will occur (the dielectric layer peels off from the electrode layer) in manufacturing.

These problems are explained below with a reference to FIGS. 13 and 14. FIG. 13 shows an equivalent circuit of a conventional two-terminal capacitor (inside the dotted box). FIG. 14 is an equivalent circuit diagram to show problems for a conventional four-terminal capacitor (inside the dotted box). To provide a capacitor that can be operated at high frequencies, ESR (equivalent series resistance) 111 and ESL (equivalent series inductance) 112 should be lowered. ESR can be lowered by using electroconductive polymers for the electrolyte or by improving the collector. ESL can be lowered by providing a four-terminal structure as shown in FIG. 14. In the conventional four-terminal capacitor in FIG. 14, however, the impedance as a capacitor element is high, and the resistance R+ (the resistance of anode) 121 and R− (the resistance of cathodic collector) 122 acting as circuit wires greatly contribute to heat generation when current flows. Thus such a structure cannot be used for a circuit of a primary or secondary side of a power supply where a relatively high current will flow. To meet the requirement, any means to decrease the R+ 121 and R− should be taken.

As mentioned above, conventional capacitors cannot meet a requirement for high capacitance and a low impedance. When such a capacitor is used for a circuit operated at high frequencies at a primary or secondary side of a power supply where a relatively high current is flowing, the element generates much heat, and the applicable current will be restricted.

SUMMARY OF THE INVENTION

This invention aims to solve the above-mentioned problems, and the goal and means of this invention are distinguishable from those of the conventional techniques. This invention solves the problems by alternately laminating electrode foils for anode and those for cathodic current collecting, further using aluminum foils with internal bulk metal layers for the electrode foils and also metal foils such as Ni for the collector electrodes. In conclusion, this invention aims to provide four-terminal capacitors with high current-carrying capacity, high capacitance, low impedance and generating less heat. Such capacitors can solve problems of conventional capacitors, corresponding to operation at high frequencies as a result of lowering ESR and ESL, and they can be used for circuits operated at high frequencies such as primary or secondary sides where relatively high circuit current will flow.

In order to achieve the above-mentioned purposes, a four-terminal capacitor of this invention comprises at least an anodic valve metal foil with a dielectric layer formed thereon, a metal foil for collector (hereinafter, a collector metal foil), a cathodic electroconductive polymer layer arranged between the anodic valve metal foil and the collector metal foil, and anodic and cathodic terminals for external connection. The surface of the anodic valve metal foil is roughened, and the anodic valve metal foil and the collector metal foil are alternately laminated through the cathodic electroconductive polymer layer. Two portions of the anodic valve metal foil are electrically connected to two anodic terminals separately, while two portions of the collector metal foil are electrically connected to two cathodic terminals separately. Accordingly, a four-terminal capacitor that can meet high frequencies caused by low ESR or low ESL is obtained. Such a capacitor can be used also for circuits at primary or secondary sides of a power supply where a relatively high current flows. The capacitor has a high current-carrying capacity, high capacitance, low impedance and generates less heat.

A line segment linking the two separate anodic terminals (or the two joint portions connected to the respective anodic terminals for the anodic valve metal foil) and a line segment linking the two separate cathodic terminals (or the two joint portions connected to the respective cathodic terminals for the collector metal foil) can cross each other or not when viewed from the lamination direction.

In the above structure, preferably, the anodic valve metal foil and the collector metal foil are aluminum foils with roughened surfaces, having unroughened bulk metal layers respectively inside the foils.

The collector metal foil is preferably a nickel foil, a copper foil or an aluminum foil including carbon particles.

It is still preferable that the anodic valve metal foil is an aluminum foil with a roughened surface, having an unroughened bulk metal layer inside the foil, while the collector metal foil is a nickel foil, copper foil or an aluminum foil including carbon particles.

BRIEF DESCRIPTION OF THE DRAWINGS

FIG. 2(a) is a perspective view to show the appearance of a four-terminal capacitor of this invention, while

DETAILED DESCRIPTION OF THE PREFERRED EMBODIMENT

The present invention is described in detail below referring to the attached FIGS. 1–9.
(First Embodiment)

Figure 1:
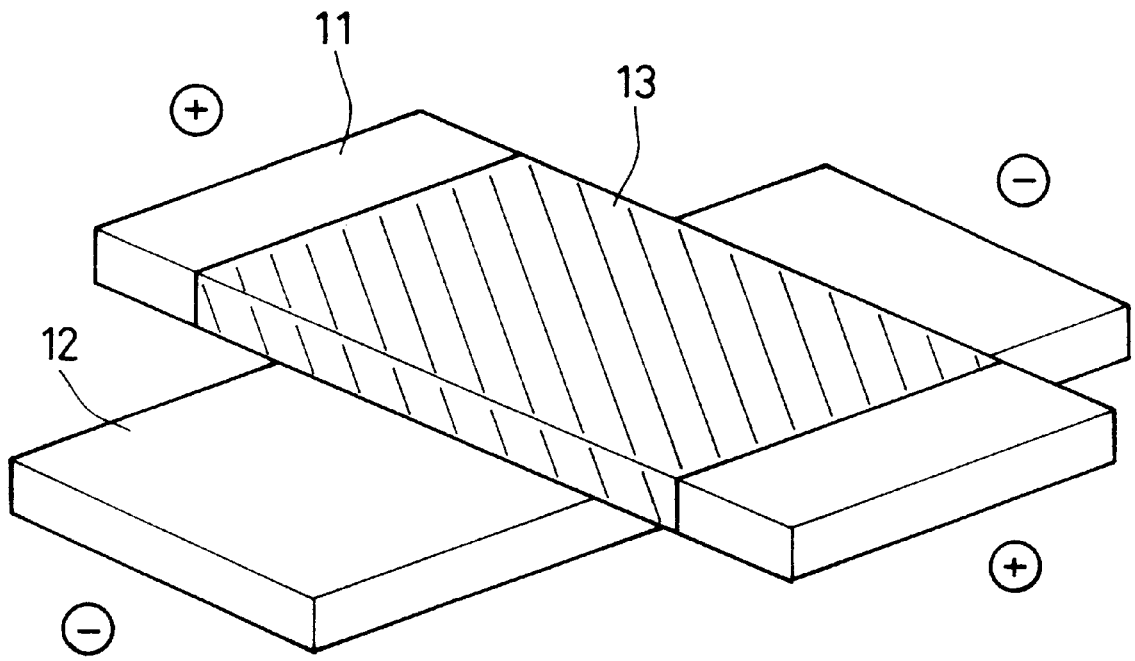
FIG. 1 shows the structure of a capacitor element of a four-terminal capacitor of this invention.

FIG. 1 shows the structure of a capacitor element of a four-terminal capacitor of this invention. The surface of an anodic valve metal foil 11 is roughened by an electrolytic etching or the like to increase the surface area. On the surface of this anodic valve metal foil 11, a dielectric layer 13 is formed by anodization. This anodic valve metal foil 11 and a collector metal foil 12 are crossed and overlapped at approximately their center parts. For conduction, the dielectric layer is not formed at both ends or end faces of the anodic valve metal foil 11 to be connected with the anodic terminals. The capacitor element is provided by forming an electroconductive polymer layer such as polypyrrole for the true cathode between the anodic valve metal foil 11 and the collector metal foil 12. By using an electroconductive polymer layer for the true cathode, and also by directly contacting the collector metal foil 12 and the electroconductive polymer layer, the ESR can be lowered. The ESL can be also lowered by alternately laminating the anodic valve metal foil 11 and the collector metal foil 12.

Figure 2A:
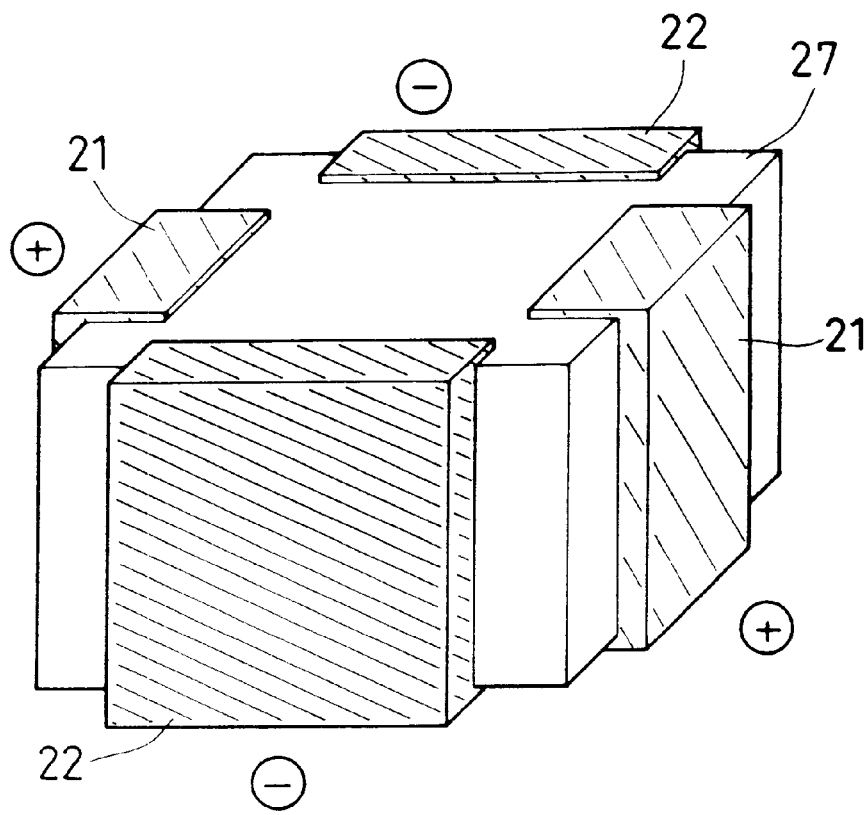
Figure 2B:
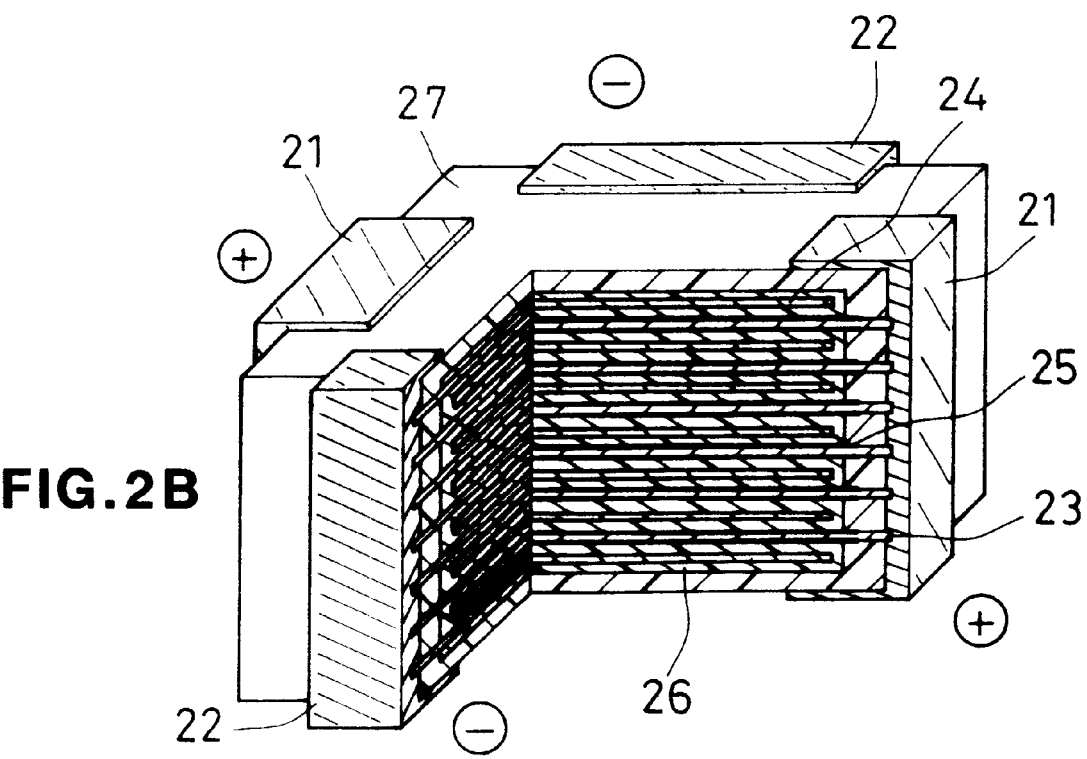
FIG. 2(b) is a partially broken perspective cross-sectional view to show the in internal structure.

FIGS. 2(a) and 2(b) show the structure of a four-terminal capacitor of this invention. FIG. 2(a) is a perspective view to show the appearance, while FIG. 2(b) is a partially broken perspective cross-sectional view to show the internal structure. In FIGS. 2(a) and (b), 21 refers to anodic terminals, and 22 refers to cathodic terminals. Numeral 23 refers to anodic valve metal foils, 24 refers to collector metal foils, and 25, dielectric layers. Numeral 26 refers to cathodic electroconductive polymer layers, and 27 refers to a mold resin. Anodic valve metal foils 23, roughened and treated to have surfaces provided with dielectric layers 25 excepting the ends or the end faces, and collector metal foils 24 are alternately laminated as needed to cross each other, and the cathodic electroconductive polymer layers 26 are filled between the anodic valve metal foils 23 and collector metal foils 24. The surfaces of the collector metal foils 24 can be roughened. The anodic terminals 21 are connected to the ends of each anodic valve metal foil 23, and the cathodic terminals 22 are connected to the ends of each collector metal foil 24. The structure shown in FIGS. 2(a) and (b) allows high capacitance as well as low ESR and low ESL.

Figure 3:
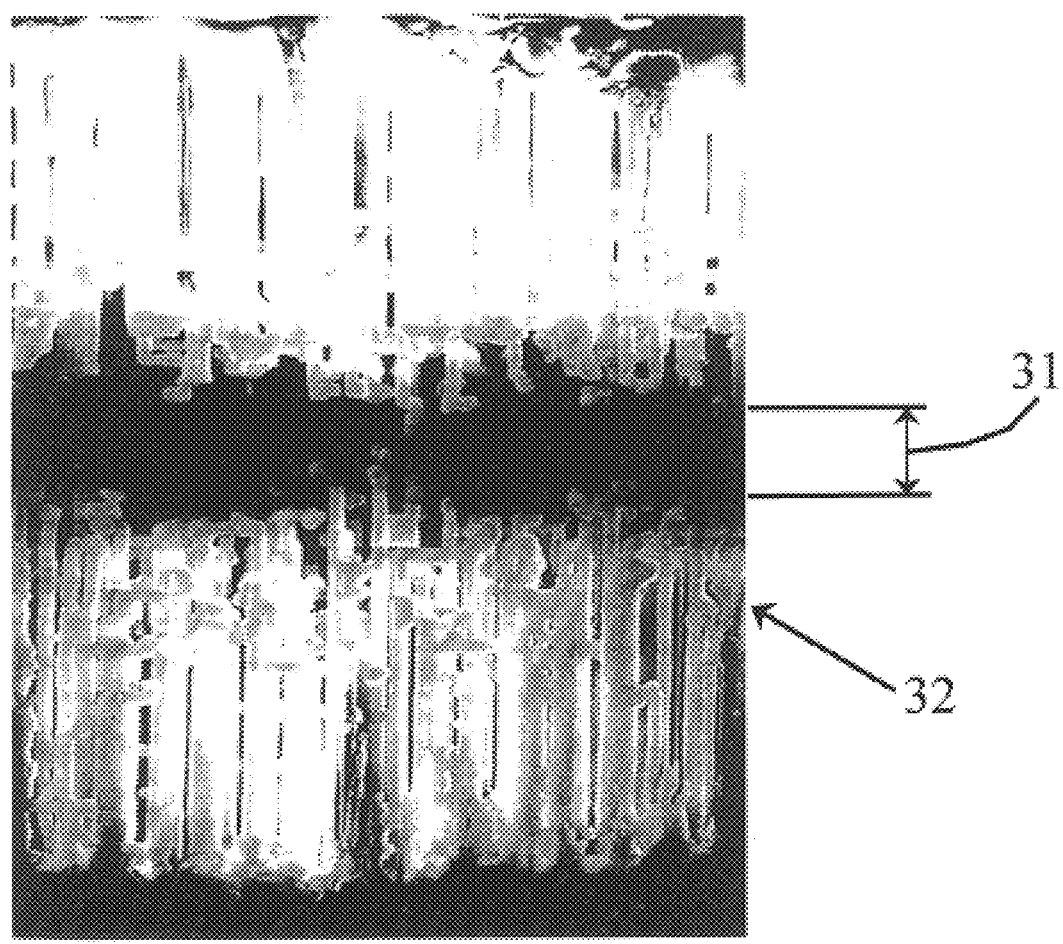
FIG. 3 is an electron micrograph of a cross section of an anodic valve metal foil that can be used for a four-terminal capacitor of this invention.

FIG. 3 is an electron micrograph of a cross section of an anodic valve metal foil available for a four-terminal capacitor of this invention. The anodic valve metal foil shown in FIG. 3 is an aluminum foil in which columnar pores 32 are formed by electrolytic direct current etching to increase the surface area. In FIG. 3, 31 refers to an unroughened bulk metal layer. The foil thickness in FIG. 3 is about 150 $\mu$m, and the bulk metal layer 31 is about 15 $\mu$m in thickness. The bulk metal layer 31 can be modified, or be made thicker or thinner by controlling the length of the columnar pores 32 or the foil thickness. Therefore, the configuration of the anodic valve metal foil is not limited to this embodiment. The columnar pores 32 can be also used for a four-terminal capacitor for high-voltage, and the dielectric layer can be formed for high-voltage (the thickness is up to about 5800 angstrom; 10 angstrom/volt). For higher capacitance, the dielectric layer can be made thin, and etched with alternating current to increase the surface area.

Figure 4:
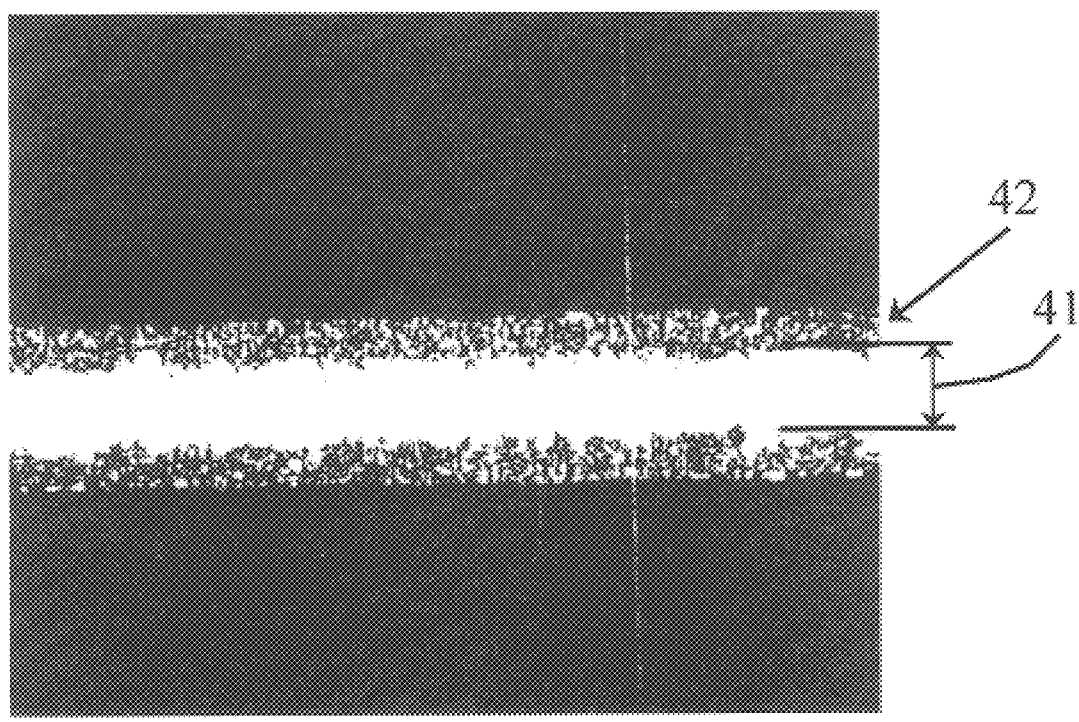
FIG. 4 is an electron micrograph of a cross section of a collector metal foil that can be used for a four-terminal capacitor of this invention.

FIG. 4 is an electron micrograph of a cross section of a collector metal foil available for a four-terminal capacitor of this invention. The collector metal foil in FIG. 4 is an aluminum foil, roughened by electrolytic a.c. etching to increase the surface area. In FIG. 4, 41 refers to a bulk metal layer, and 42 refers to etching pores. The foil thickness in FIG. 4 is about 90 $\mu$m, and the thickness of the bulk metal layer 41 is about 45 $\mu$m. The thickness of this bulk metal layer can be modified according to the etching condition and foil thickness. The configuration of the collector metal foil is not limited to this embodiment.

By using an anodic valve metal foil and also a collector metal foil, both having inside unroughened bulk metal layers, this invention facilitates a circuit current flowing through the bulk metal layer. Thus, a four-terminal capacitor with less heat generation and a higher current-carrying capacity can be obtained. In addition, lamination of short electrode foils increases the cross-sectional area for the flowing current, and the resistance can be reduced. When 1 A current is applied to an electrode foil that is 100 $\mu$m in thickness and has an unetched bulk metal layer (thickness:50 $\mu$m, length: 17 cm, and width:1.5 cm), the heat generation is about 6 mW if the volume resistivity of Al is about 2.6 E–6 $\Omega$cm. When the flowing current is 10 A, the heat generation is about 0.6 W If this foil is separated into ten equal pieces and the ten pieces are laminated, the total cross-sectional area of the bulk metal layer increases ten times while the length becomes 1/10, and thus the resistivity can be about 1/100. Heat generation also can be controlled to about 1/100.

The current-carrying capacity can be increased also by using a collector metal foil of an Ni foil, a Cu foil, or an aluminum foil including carbon particles, since such a foil allows use of any desired thickness. The volume resistivity of Ta is about 10.4 E–6 $\Omega$cm, Al is about 2.6 E–6 $\Omega$cm, Ni is about 6.8 E–6 $\Omega$cm, and Cu, about 1.7 E–6 $\Omega$cm. This indicates that the current-carrying capacity can be increased by using an aluminum foil with a bulk metal layer, an Ni foil, or a Cu foil.

Since Ni tends not to form an oxide layer on its surface, an Ni foil can reduce the interfacial resistance to the electroconductive polymer layer, and can help to lower the ESR. In addition, since the collector metal foils do not have any capacity due to the oxide coatings, the capacity of the capacitor can be increased.

Figure 5:
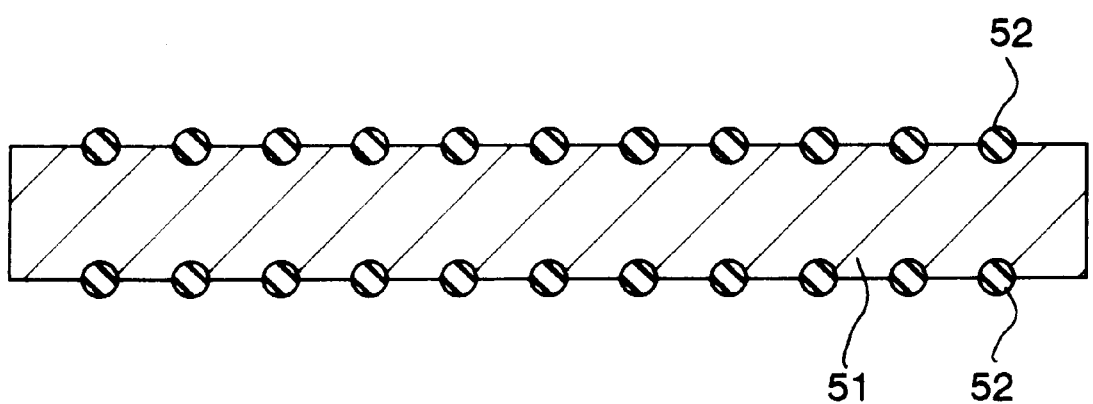
FIG. 5 is a cross-sectional view to show the configuration of an luminum foil including carbon particles, which can be used for a four-terminal capacitor of this invention.

FIG. 5 is a cross-sectional view to show the configuration of an aluminum foil including carbon particles, which can be used for a four-terminal capacitor of this invention. In FIG. 5, 51 refers to aluminum, and 52 refers to electroconductive carbon particles. The aluminum foil with carbon particles is configured to expose electroconductive carbon particles on the surfaces of the foil. Since the electroconductive polymer layer and carbon particles contact with each other without intervention by an oxide coating layer, the interfacial resistance can be reduced compared to the use of an aluminum foil that easily forms an oxide coating, and the ESR can be lowered. Furthermore, an electroconductive polymer layer can be formed on the aluminum foil including carbon particles by an electrolytic polymerization, which is not available in conventional techniques, since an aluminum foil including carbon particles is used. As a result, the cost for producing a four-terminal capacitor of this invention can be reduced.

Although a Cu foil easily forms an oxide layer, it can pass more current as a collector metal foil because of its small volume resistivity as a metal.

In this first embodiment mentioned above, a four-terminal capacitor with low impedance and extremely high current-carrying capacity can be provided.

Figure 6:
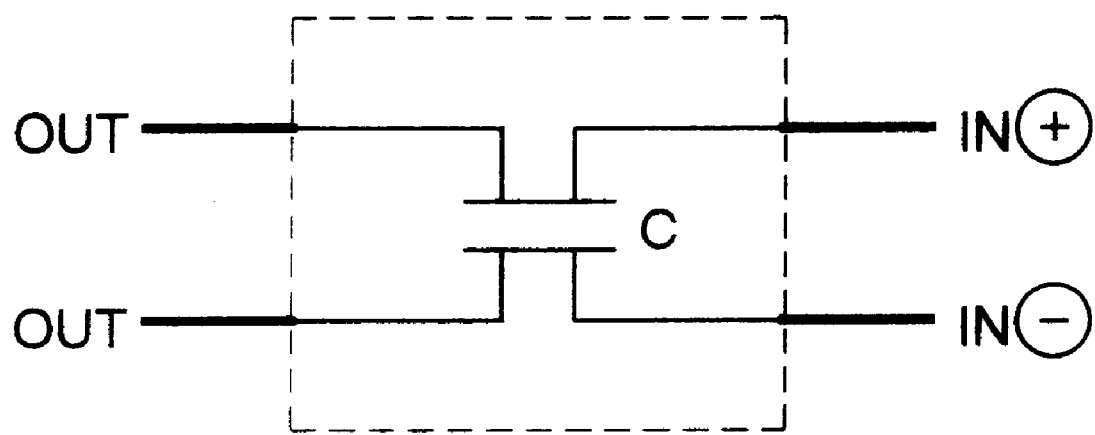
FIG. 6 is an equivalent circuit diagram representing the concept of a four-terminal capcitor of this invention.

FIG. 6 is an equivalent circuit diagram representing the concept of a four-terminal capacitor of this invention. This invention can provide a four-terminal capacitor approximate to the equivalent circuit shown in FIG. 6, with low impedance, low ESR, and low ESL.

In the above description of this first embodiment, a line segment linking the two separate anodic terminals and a line segment linking the two separate cathodic terminals cross each other when viewed from the lamination direction, but the structure of the terminals will not be limited thereto.

Figure 7A:
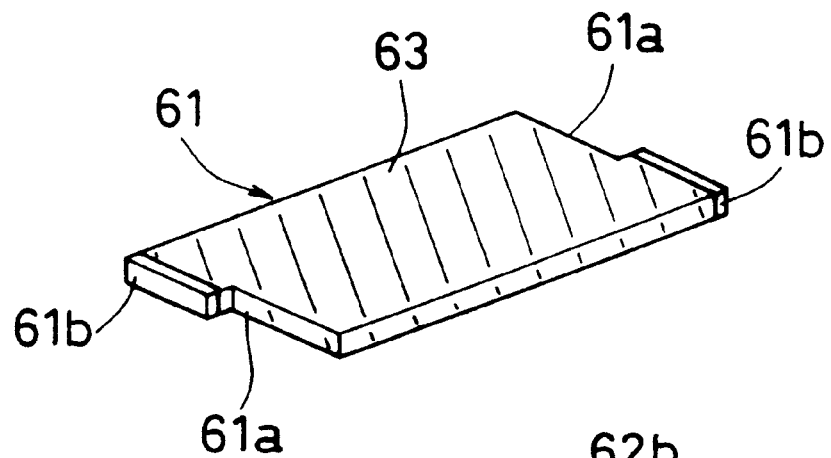
FIG. 7(a) is an exploded perspective view to show the structure of a different four-terminal capacitor of this invention.
Figure 7B:
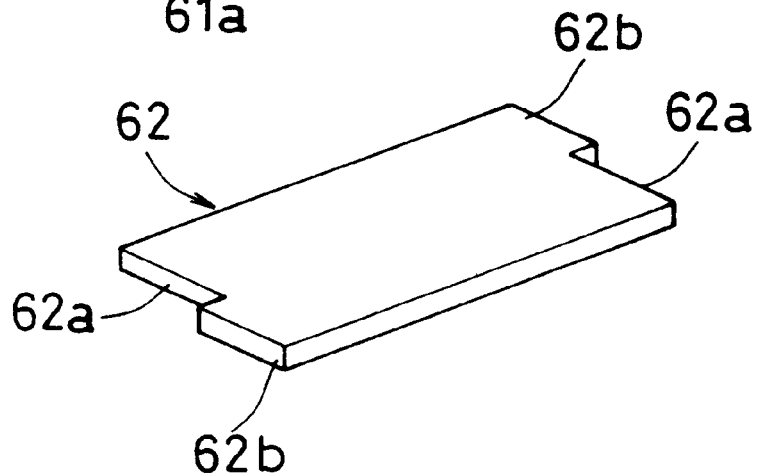
FIG. 7(b) shows a different anodic valve metal foil for the four-terminal capacitor in FIG. 7(a).

FIG. 7(a) shows the structure of another four-terminal capacitor of this invention. In FIG. 7(a), 61 refers to a rectangular or square anodic valve metal foil, 62 refers to a collector metal foil being shaped substantially the same as the anodic valve metal foil 61, and 63 refers to a dielectric layer. The anodic valve metal foil 61 has rectangular notches 61a at two diagonally opposite corners. Similarly, the collector metal foil 62 has rectangular notches 62a at two diagonally opposite corners. As shown in FIG. 7(a), the positions of the notches 62a are shifted so that the notches (61a and 62a) are not overlapped when the anodic valve metal foil 61 and the collector metal foil 62 are laminated. The anodic valve metal foil 61 is provided with the dielectric layer 63 on the surface excepting the end parts to be connected with the anodic terminals. Thus prepared anodic valve metal foils 61 and the collector metal foils 62 are laminated sequentially through cathodic electroconductive polymer layers (not shown) as required, and different anodic terminals are connected to the remaining two corners 61b of each anodic valve metal foil 61 while different cathodic terminals are connected to the remaining two corners 62b of each collector metal foil 62. As a result, a four-terminal capacitor, in which a line segment linking two anodic terminals and a line segment linking two cathodic terminals cross each other when viewed from the lamination direction, is obtained. For this capacitor, the anodic valve metal foil 61 can be replaced by an anodic valve metal foil 61' shown in FIG. 7(b). This anodic valve metal foil 61' is provided with the dielectric layer 63 on the surface excepting its end faces 64 to be connected with anodic terminals.

Figure 8A:
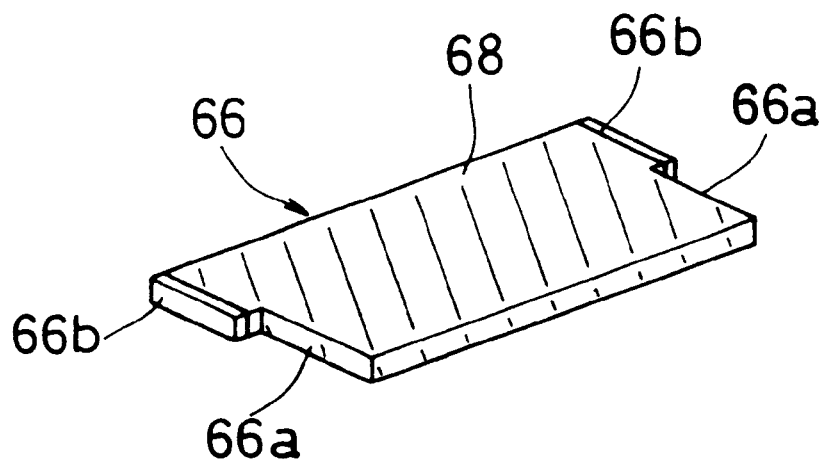
FIG. 8(a) is an exploded perspective view to show the structure of a different four-terminal capacitor of this invention.
Figure 8B:
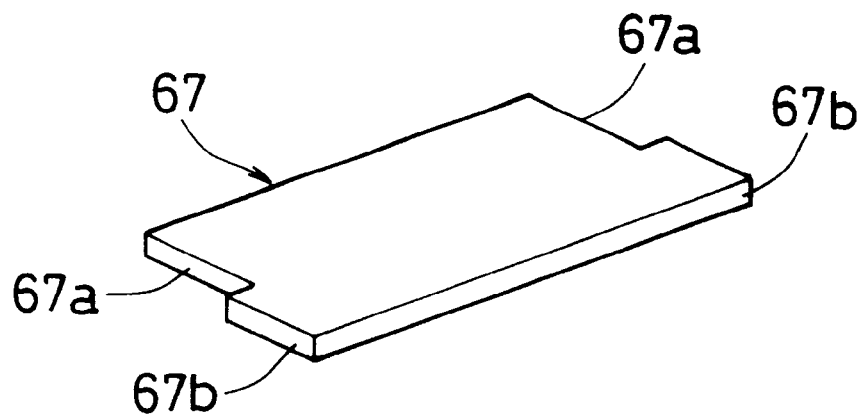
FIG. 8(b) shows a different anodic valve metal foil for the four-terminal capacitor in FIG. 8(a).

FIG. 8(a) shows the structure of still another four-terminal capacitor of this invention. In FIG. 8(a), 66 refers to a rectangular or square anodic valve metal foil, 67 refers to a collector metal foil being shaped substantially the same as the anodic valve metal foil 66, and 68 refers to a dielectric layer. The anodic valve metal foil 66 has rectangular notches 66a at its two corners adjacent to each other. Similarly, the collector metal foil 67 has rectangular notches 67a at two adjacent corners. As shown in FIG. 8(a), the positions of the notches 67a are shifted so that the notches (66a and 67a) are not overlapped when the anodic valve metal foil 66 and the collector metal foil 67 are laminated. The anodic valve metal foil 66 is provided with the dielectric layer 68 on the surface excepting the end parts to be connected with the anodic terminals. Thus prepared anodic valve metal foils 66 and the collector metal foils 67 are laminated sequentially through cathodic electroconductive polymer layers (not shown) as required, and different anodic terminals are connected to the remaining two corners 66b of each anodic valve metal foil 66 while different cathodic terminals are connected to the remaining two corners 67b of each collector metal foil 67. As a result, a four-terminal capacitor, in which a line segment linking two anodic terminals and a line segment linking two cathodic terminals do not cross each other when viewed from the lamination direction, is obtained. For this capacitor, the anodic valve metal foil 66 can be replaced by an anodic valve metal foil 66' shown in FIG. 8(b). This anodic valve metal foil 66' is provided with the dielectric layer 63 on the surface excepting its end faces 69 to be connected with anodic terminals.

It is needless to say that the size of the final products in this embodiment can be modified according to the capacitance or current-carrying capacity. It is also possible to determine the thickness of the bulk metal layer of the anodic valve metal foil or that of the collector metal foil according to the desired current-carrying capacity.

EXAMPLE 1

A four-terminal capacitor shown in FIG. 2 was manufactured. For the anodic valve metal foils 23, a 100 $\mu$m-thick aluminum foil with a purity of at least 99.98% was used. The surface of the anodic valve metal foil 23 was roughened by an electrolytic a.c. etching in a 35° C. solution containing 10 wt % hydrochloric acid before the same foil 23 was cut into rectangular pieces. The bulk metal layer of the anodic valve metal foil 23 was 55 $\mu$m in thickness. The dielectric layer 25 was formed on the anodic valve metal foil 23, excepting the ends of the same foil, by a constant-voltage anodization at 12V using a 60° C. aqueous solution containing 5 wt % ammonium adipate (for 6.3 WV). For the collector metal foil 24, a 50 $\mu$m-thick Ni foil shaped substantially the same as the anodic valve metal foil 23 was used. On the surface of the collector metal foil 24 excepting the end parts to be connected with the cathodic terminals 22, a cathodic electroconductive polymer layer 26 of polypyrrole was formed previously by an electrolytic polymerization to be several $\mu$m in thickness. Respectively ten layers of anodic valve metal foils 23 and the collector metal foils 24 were laminated to cross at an angle of 90° in the longitudinal direction. For conduction, the ends of each anodic valve metal foil 23 and those of each collector metal foil 24 were connected by a mechanical treatment respectively with the anodic terminals 21 and the cathodic terminals 22. Subsequently only the terminal joints were coated with the mold resin 27 before finishing the cathodic electroconductive polymer layer 26 between the anodic valve metal foil 23 and the collector metal foil 24 by an impregnation chemical polymerization. The entire element except for the terminals' surfaces was molded with the mold resin 27 to provide a four-terminal capacitor. The case size was D.

EXAMPLE 2

A four-terminal capacitor shown in FIG. 2 was manufactured. For the anodic valve metal foils 23, a 100 $\mu$m-thick aluminum foil with a purity of at least 99.98% was used. The surface of the anodic valve metal foil 23 was roughened by an electrolytic a.c. etching in a 35° C. solution containing 10 wt % hydrochloric acid before being cut into rectangular pieces. The bulk metal layer of the anodic valve metal foil 23 was 55 $\mu$m in thickness. The dielectric layer 25 was formed on the anodic valve metal foil 23 excepting the ends of the same foil, by a constant-voltage anodization at 12V using a 60° C. aqueous solution containing 5 wt % ammonium adipate. For the collector metal foils 24, a 50 $\mu$m-thick aluminum foil including electroconductive carbon was used. The collector metal foils 24 were shaped substantially the same as the anodic valve metal foils 23. The aluminum foil including carbon was prepared by applying electroconductive carbon on the roughened surface of the aluminum foil, pressing and further roughening the surface. On the surface of the collector metal foil 24 excepting the end parts to be connected with the cathodic terminals 22, a cathodic electroconductive polymer layer 26 of polypyrrole was formed previously by an electrolytic polymerization to be several $\mu$m in thickness. Respectively ten layers of anodic valve metal foils 23 and the collector metal foils 24 were laminated to cross at an angle of 90° in the longitudinal direction. For conduction, the ends of each anodic valve metal foil 23 and those of each collector metal foil 24 were connected by a mechanical treatment respectively with the anodic terminals 21 and the cathodic terminals 22. Subsequently only the terminal joints were coated with the mold resin 27 before finishing the cathodic electroconductive polymer layer 26 between the anodic valve metal foil 23 and the collector metal foil 24 by an impregnation chemical polymerization. The entire element except for the terminals' surfaces was molded with the mold resin 27 to provide a four-terminal capacitor. The case size was D.

COMPARATIVE EXAMPLE

A capacitor element structurally based on an aluminum electrolytic capacitor (a 105° C. specification, 400 working volts, anodization voltage:580V) was prepared by leading out respectively two portions of the anodic leads and cathodic leads from both ends of the anodic foil and those of the current-collecting cathode foil, and winding these via a separator. The electrode foil and cathode foil were 19 cm in length and 2 cm in width. The surface of the anodic foil was roughened to form columnar pores by an electrolytic direct current (d.c.) etching in a 85° C. solution containing hydrochloric acid and sulfuric acid. A dielectric layer was formed by a constant-voltage anodization at 580V using a 60° C. aqueous solution containing 5 wt % ammonium adipate. The thickness of the bulk metal layer of the anodic foil was 3 to 5 $\mu$m. For the current-collecting cathode foil, a 50 $\mu$m-thick aluminum foil was used. The surface of the current-collecting cathode foil was roughened by an electrolytic a.c. etching in a 35° C. solution containing 10 wt % hydrochloric acid. The capacitor element was placed in an aluminum case (D: 30 mm, L: 30 mm), and an electrolytic solution was impregnated under reduced pressure before sealing the opening, thus a wound four-terminal capacitor was obtained. The lead joints were anodized in the electrolytic solution after the sealing step.

The performance of the four-terminal capacitors in Examples 1, 2 and in Comparative Example is explained below with reference to Table 1.

TABLE 1

|  | Capacitance ($\mu$F) | Heating value (W) | ESR (m$\Omega$) | Z (m$\Omega$) |
| --- | --- | --- | --- | --- |
| Example 1 | 300 | No heat | 7 | 60 |
| Example 2 | 310 | No heat | 5 | 55 |
| Comparative Example | 200 | 0.1 | 2000 | 2070 |

In Table 1, the heating value was measured while passing a current of 1 A, the capacitance was measured at 120 Hz, and the impedance Z and ESR, at 1 MHz.

As shown in Table 1, the heating values in Examples 1 and 2 are considerably small due to the four-terminal structure of this invention. "No heat" in Table 1 indicates that the heating value is extremely small. The ESR is considerably decreased in Example 1, and further decreased in Example 2. The impedance (the L component) can be lowered at high frequencies by a four-terminal capacitor of this invention.

EXAMPLE 3

A four-terminal capacitor shown in FIG. 2 was manufactured. For the anodic valve metal foils 23, an aluminum foil with a purity of at least 99.98% (thickness: 100 $\mu$m, width: 5 mm, and length: 25 mm) was used. The surface of each anodic valve metal foil 23 was roughened to form pores by an electrolytic a.c. etching in a 35° C. solution containing 10 wt % hydrochloric acid. The dielectric layer 25 was formed on the anodic valve metal foil 23, excepting the ends of the same foil, by a constant-voltage anodization at 23V using a 60° C. aqueous solution containing 5 wt % ammonium adipate. For the collector metal foils 24, a 90 $\mu$m-thick aluminum foil was used. The aluminum foil was roughened by an electrolytic a.c. etching in a 35° C. solution containing 10 wt % hydrochloric acid before being cut and used. Each collector metal foil 24 was 5 mm in width and 25 mm in length. On the surface of the collector metal foil 24 excepting the end parts to be connected with the cathodic terminals 22, a cathodic electroconductive polymer layer 26 of polypyrrole was formed previously by an electrolytic polymerization to be several $\mu$m in thickness. Respectively three layers of anodic valve metal foils 23 and the collector metal foils 24 were laminated to cross at an angle of 90° in the longitudinal direction. For conduction, the ends of each anodic valve metal foil 23 and those of each collector metal foil 24 were connected by a mechanical treatment respectively with the anodic terminals 21 and the cathodic terminals 22. Subsequently only the terminal joints were coated with the mold resin 27 before finishing the cathodic electroconductive polymer layer 26 between the anodic valve metal foil 23 and the collector metal foil 24 by an impregnation chemical polymerization. The entire element excepting the terminals' surfaces was molded with the mold resin 27 to provide a four-terminal capacitor.

Figure 9:
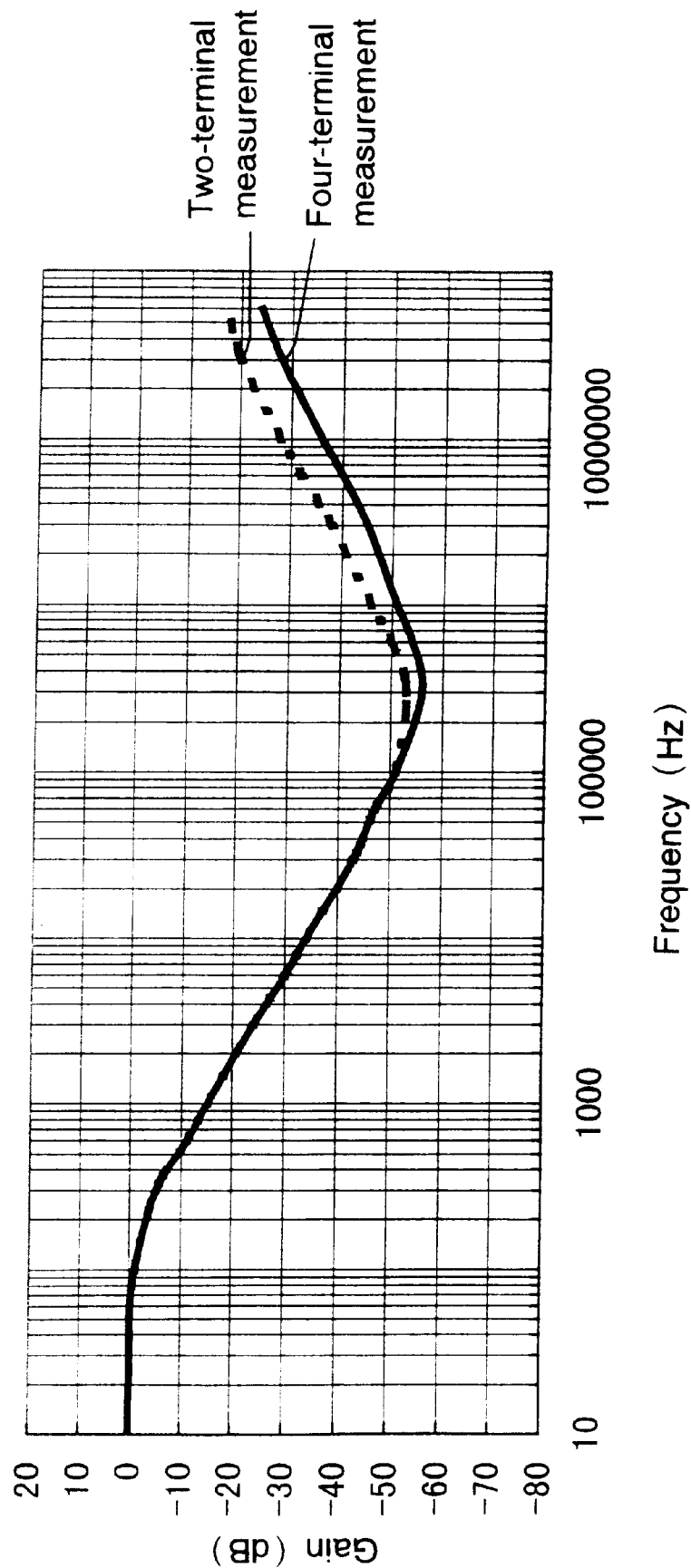
FIG. 9 is a graph to show the relationship between the frequencies and the gains measured by using four terminals and two terminals of a four-terminal capacitor Example 3 of this invention.
Figure 10:
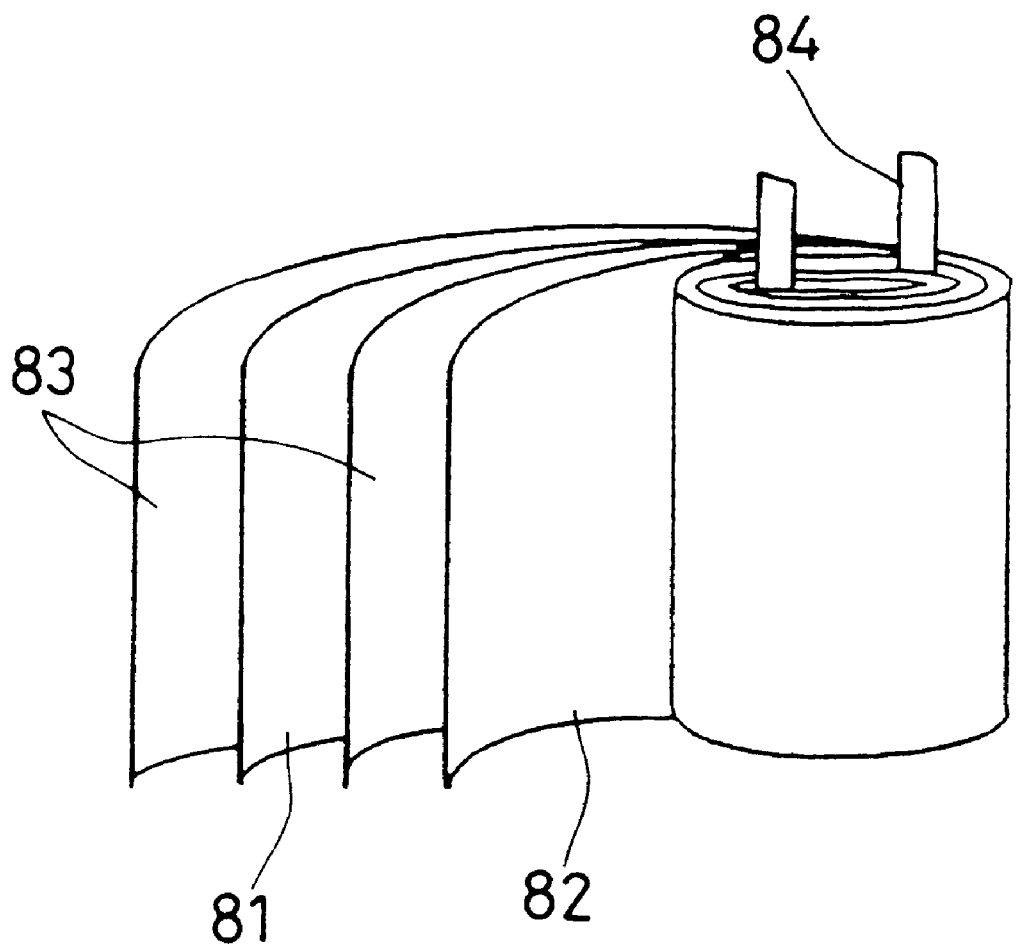
FIG. 10 is a schematic view to show the structure of a conventional aluminum electrolytic capacitor.
Figure 11:
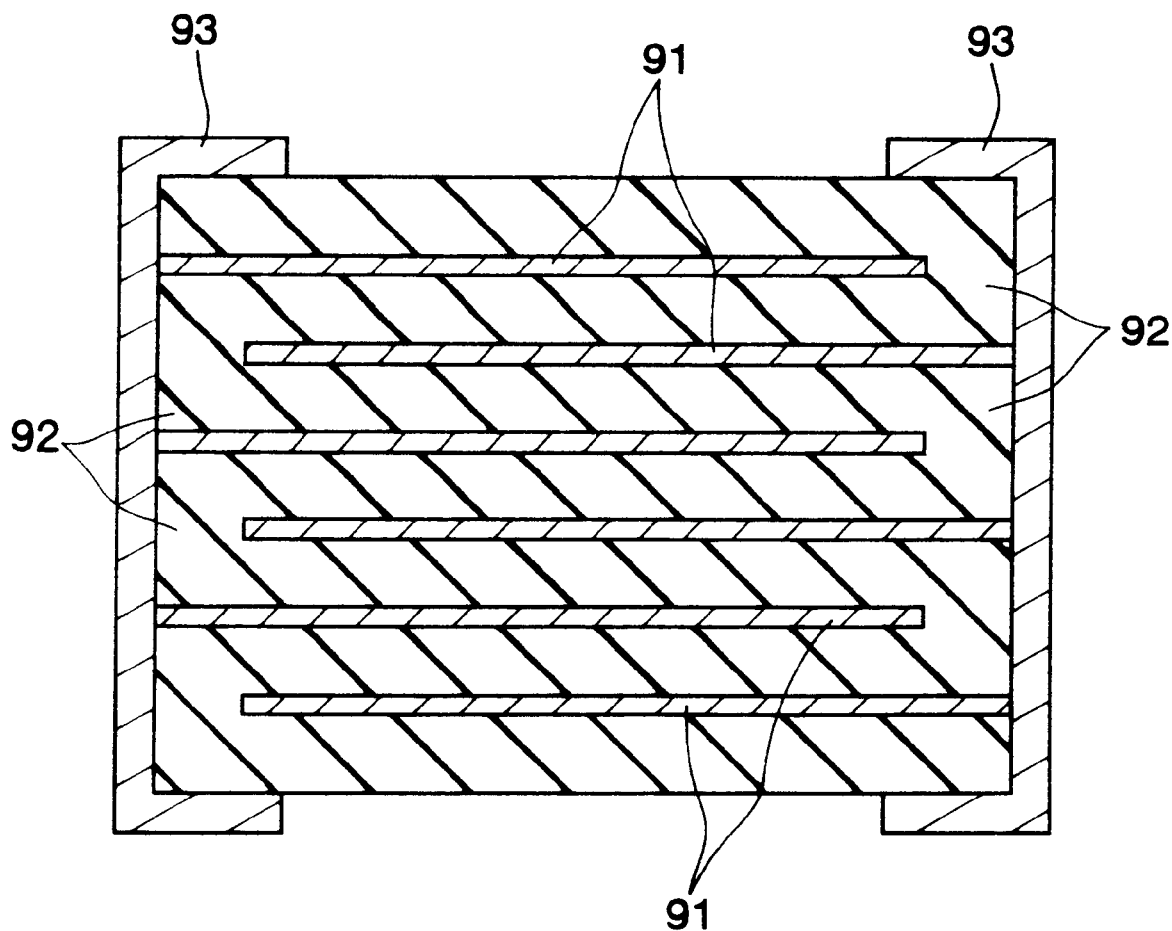
FIG. 11 is a cross-sectional view to show the structure of a conventional multilayer ceramic chip capacitor.
Figure 12A:
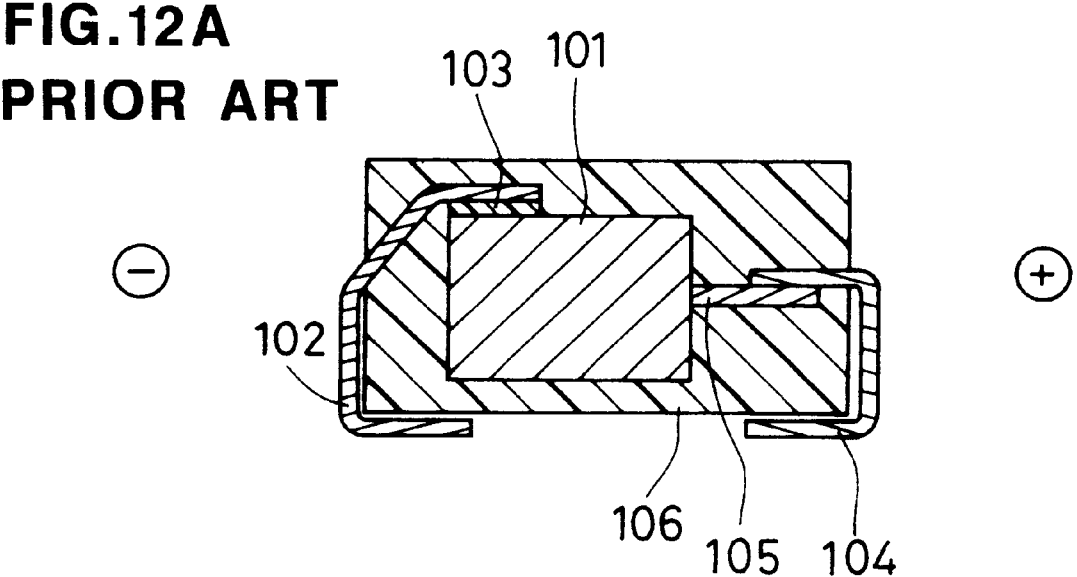
FIG. 12(a) is a cross-sectional view to show the structure of a conventional tantalum electrolytic capacitor.
Figure 12B:
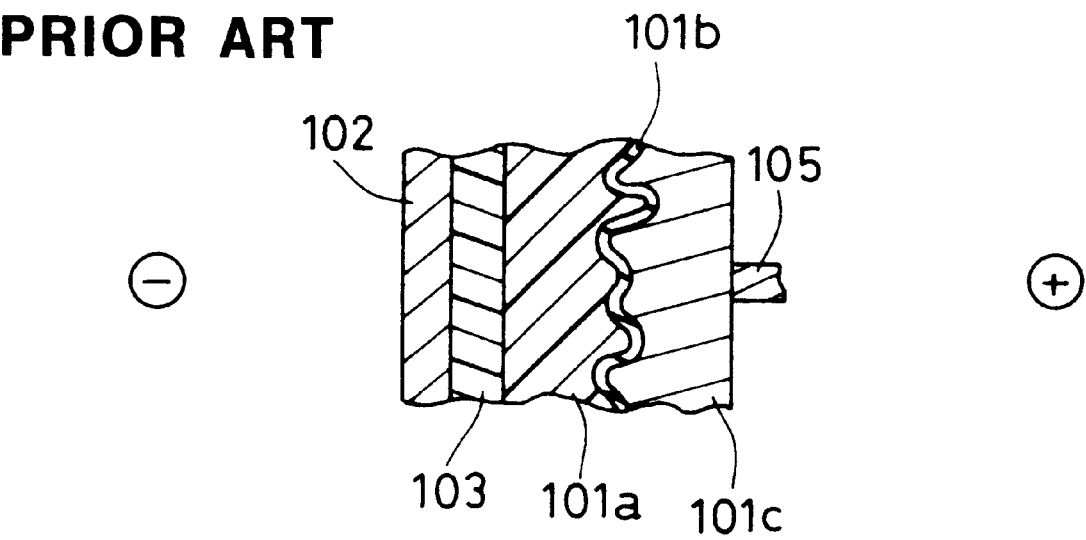
FIG. 12(b) is an expanded cross-sectional view to partially show the configuration of the capacitor element.
Figure 13:
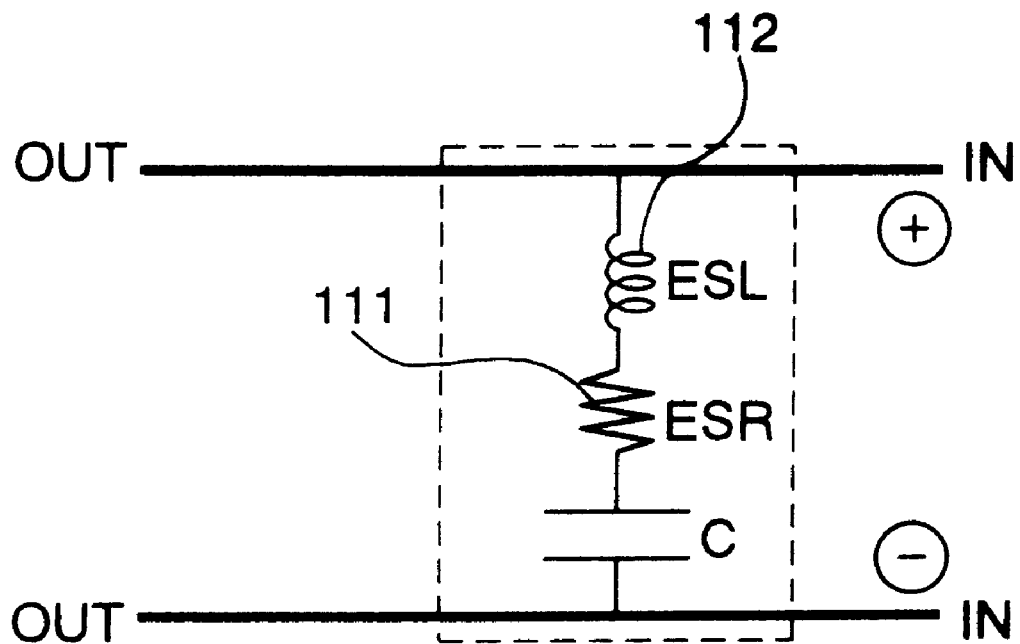
FIG. 13 is an equivalent circuit diagram of a conventional two-terminal capacitor.
Figure 14:
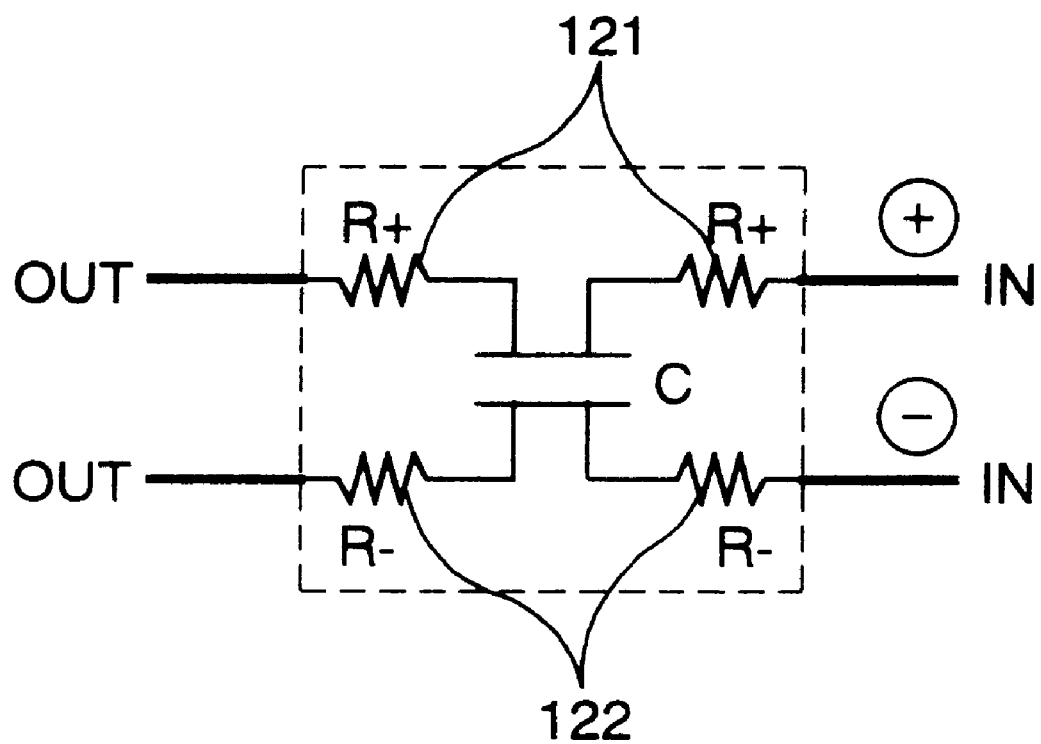
FIG. 14 is an equivalent circuit diagram to show the problems for a conventional four-terminal capacitor.

The performance of the four-terminal capacitor in Example 3 for lowering the L component is explained below with reference to the result of a gain-phase impedance measurement carried out by using two terminals and four-terminals of the same four-terminal capacitor. FIG. 9 shows the relationship between the frequencies and gains at the measurement of two terminals and four terminals of the four-terminal capacitor in Example 3. In FIG. 9, the "two-terminal measurement" means the lowering of ESL of the four-terminal capacitor in Example 3 when the capacitor was used as a two-terminal capacitor. "Four-terminal measurement" is the lowering of ESL when the four-terminal capacitor in Example 3 was used in itself to meet a purpose of this invention.

Figure 7B:
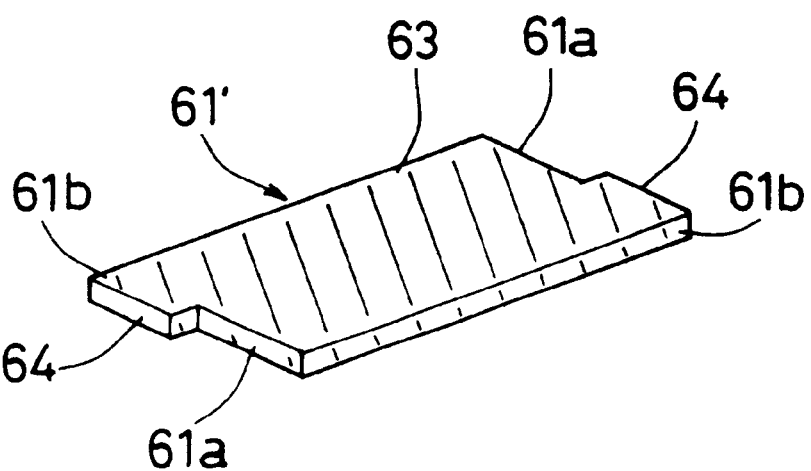
Figure 8B:
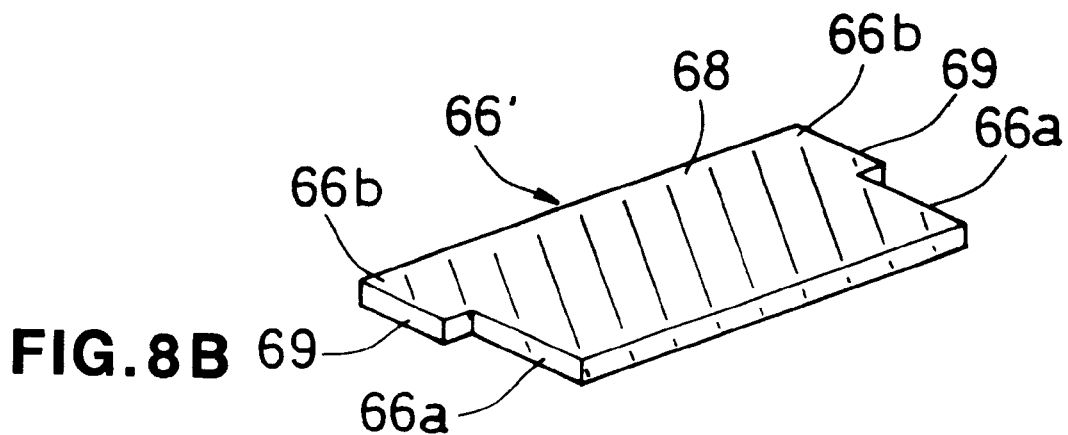

As shown in FIG. 9, the inductance at high frequencies was lowered when the capacitor was used as a four-terminal capacitor, and thus low impedance was obtained. In a similar evaluation on four-terminal capacitors prepared by laminating the above anodic valve metal foils 23 and collector metal foils 24 as shown in FIGS. 7 and 8, the inductance was lowered at high frequencies.

Thus, a four-terminal capacitor of this invention is excellent in current-carrying capacity and lowering impedance.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A four-terminal capacitor comprising an anodic valve metal foil having a dielectric layer formed on the surface, a collector metal foil, a cathodic electroconductive polymer layer arranged between the anodic valve metal foil and the collector metal foil while being in direct contact with the dielectric layer and the collector metal foil, and first and second anodic terminals and first and second cathodic terminals for external connection, wherein:

the surface of layers of the anodic valve metal foil is roughened;

a plurality of the anodic valve metal foil layers and the collector metal foil are laminated alternately with the cathodic electroconductive polymer layer therebetween;

first and second portions of the anodic valve metal foil layers are electrically connected to the first and second anodic terminals respectively; and first and second portions of the collector metal foil are electrically connected to the first and second cathodic terminals respectively.

2. The four-terminal capacitor according to claim 1, wherein a line segment linking the first and second anodic terminals and a line segment linking the first and second cathodic terminals cross each other when viewed in the lamination direction.

3. The four-terminal capacitor according to claim 1, wherein a line segment linking the first and second anodic terminals and a line segment linking the first and second cathodic terminals have no points of intersection when viewed in the lamination direction.

4. The four-terminal capacitor according to claim 1, wherein the anodic valve metal foil and the collector metal foil are aluminum foils with roughened surfaces, and the internal cross sections of the anodic valve metal foil and the collector metal foil have unroughened bulk metal layers respectively.

5. The four-terminal capacitor according to claim 1, wherein the collector metal foil is selected from the group consisting of a nickel foil, a copper foil and an aluminum foil including carbon particles.

6. The four-terminal capacitor according to claim 1, wherein the anodic valve metal foil is an aluminum foil and an unroughened internal bulk metal layer while the collector metal foil is selected from the group consisting of a nickel foil, a copper foil and an aluminum foil including carbon particles.

* * * * *